July 4, 1933.  E. R. GREER  1,916,928
DUMP WAGON
Filed March 28, 1929    3 Sheets-Sheet 1

INVENTOR
EDWARD R. GREER
BY
ATTORNEYS

July 4, 1933.                E. R. GREER              1,916,928
                              DUMP WAGON
                        Filed March 28, 1929        3 Sheets-Sheet 3

INVENTOR
EDWARD R. GREER
BY Paul, Paul Moore
ATTORNEYS

Patented July 4, 1933

1,916,928

UNITED STATES PATENT OFFICE

EDWARD R. GREER, OF MINNEAPOLIS, MINNESOTA

DUMP WAGON

Application filed March 28, 1929. Serial No. 350,551.

This invention relates to a dump wagon, and has more especial reference to a dump wagon of the semi-trailer type.

The general object of the invention is to provide a dump wagon wherein will be incorporated various specific novel and improved features and characteristics of construction designed to render the present dump wagon an improvement generally over more or less similar dump wagons heretofore known.

More specific objects will become apparent as the full description of my invention proceeds, it being understood that the disclosure herein is merely illustrative of the principles of the invention and meant in no way in a limiting sense, changes in details of construction and arrangement of parts being permissible within the scope of the claims which follow.

In the accompanying drawings forming a part of this specification,

Fig. 5 is a detail sectional view taken on line 5—5 in Fig. 1;

Fig. 6 is a detail sectional view taken on line 6—6 in Fig. 1;

Fig. 7 is a detail sectional view taken on line 7—7 in Fig. 1; and

Fig. 8 is a detail sectional view taken on line 8—8 in Fig. 2.

Figure 1:
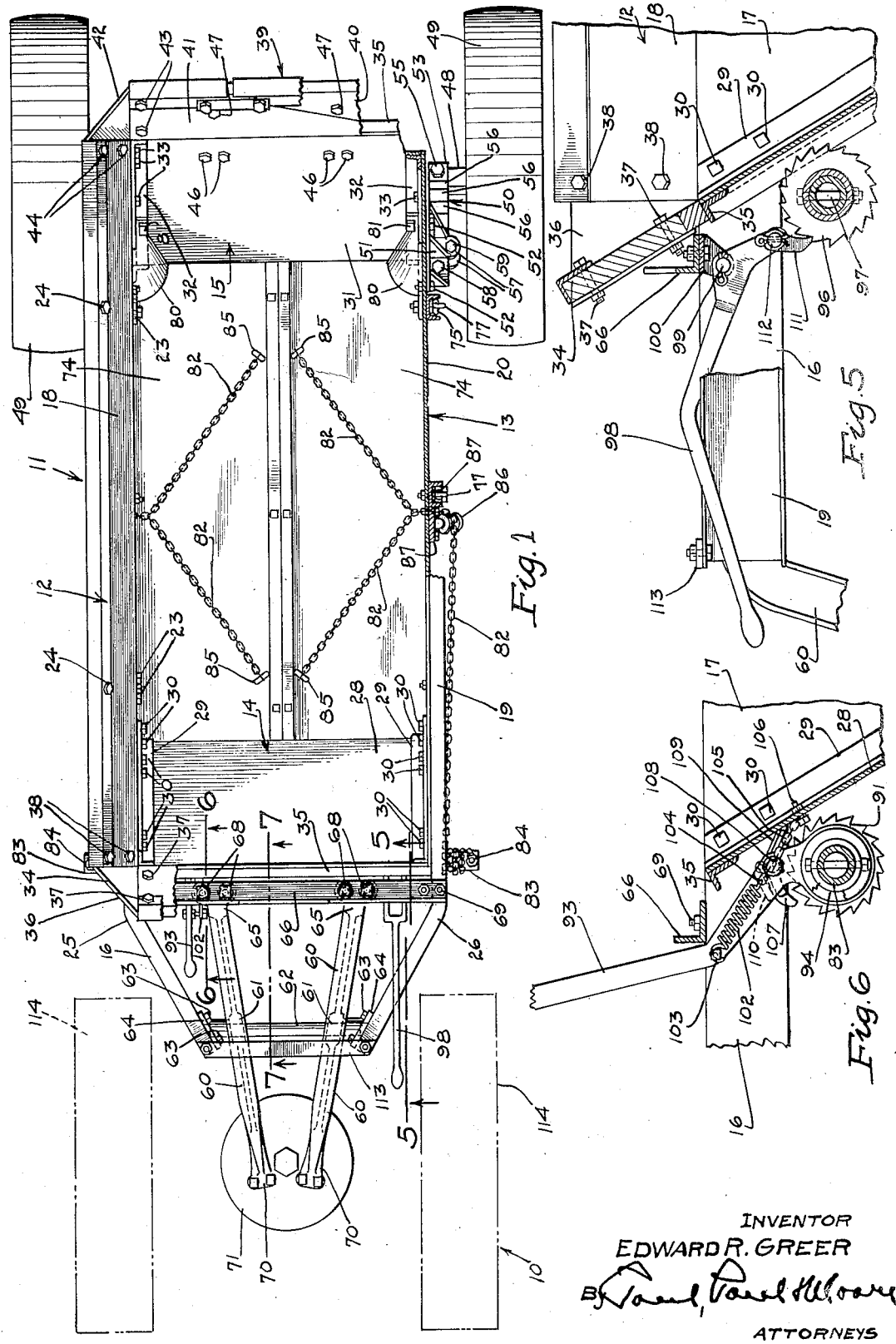
Fig. 1 is a top plan view of a dump wagon in which the features of the invention are incorporated, parts being broken away and in section to better disclose certain details.

With respect to the drawings and the numerals of reference thereon, 10 represents a tractor of any ordinary or preferred type, and 11 indicates a semi-trailer type of dump wagon made in accordance with the invention.

The wagon body includes side walls, designated 12 and 13, respectively, a front wall designated 14, and a rear wall designated 15.

The side wall 12 is composed of a channeled side frame member 16 to the lower side of which is integrally attached, as by welding, a wagon box side member 17, and to the upper side of which is fastened, in any suitable manner, a side flare board 18.

The side wall 13 is composed of a channeled side frame member 19 to the lower side of which is integrally attached, as by welding, a wagon box side member 20, and to the upper side of which is removably fastened, as by brackets 21, a side flare board 22. As disclosed, the brackets 21 receive bolts 23 and 24 which removably enter the side frame member 19 and the flare board 22, respectively.

The forward portions of the side frame members 16 and 19 extend forwardly beyond the forward ends of the wagon box side members 17 and 20 and are bent or curved inwardly, as denoted at 25 and 26, respectively, and the rearward portion of the side frame member 19 is curved downwardly, as denoted at 27, so that when the wagon is being loaded from an elevating grader the roller on the grader carrier will be guided by the curved ends of the frame member 19, to thus avoid catching of the grader upon corners of the dump wagon. A cross piece 113 extends between the forward ends of the side frame members.

The front wall 14 is composed of a wagon box front member 28, obliquely disposed to extend downwardly and rearwardly, removably secured between the side members 17 and 20 in any convenient way, as by angle pieces 29 welded to the side edge portions of the front member 28 and removably attached to the side members as by bolts 30.

The rear wall 15 is composed of a wagon box rear member 31, obliquely disposed to extend downwardly and forwardly, removably secured between the side members 17 and 20 in any convenient way, as by angle pieces 32 welded to the side edge portions of the rear member 31 and removably attached to the side members as by bolts 33, 33' and 52.

A forward flare board 34, which meets a cross member 35 welded to the upper portion of the wagon box front member 28, is removably secured to the side flare boards 18 and 22 by means of corner brackets 36 attached to the forward flare board 34 by bolts 37 and to the side flare boards by bolts 38.

A rearward flare board 39, which meets the wagon box rear member 31, is made in two pieces, indicated 40 and 41, respectively, removably secured to the side flare boards 18 and 22 by means of corner brackets 42 attached to the rearward flare board by bolts 43 and to the side flare boards by bolts 44, and removably secured to the wagon box rear member 31 by brackets 45 which receive bolts 46 entering said rear member and bolts 47 entering the rearward flare board.

The rearward portion of the wagon body is supported upon the axle 48 of rear wheels 49 by cantilever rear springs 50, one at each rear corner of said wagon body, held in position by cast brackets 51 fitted upon the outside rear corners of the wagon box and removably secured thereto, as by bolts 33' and 52. As disclosed, each cantilever rear spring consists of a flat leaf 53 and a shaped leaf 54 secured against opposite faces of an angular part of the rear axle, as by a bolt 55, and additional shorter flat leaves 56 upon the leaf 53, the whole extending forwardly and obliquely upwardly from said rear axle and securely held in a cast bracket, as between ears 57 thereof, by a bolt 58 passing through said leaf springs, and a bolt 59 extending through said ears at the outer edges of said leaf springs.

Figure 2:
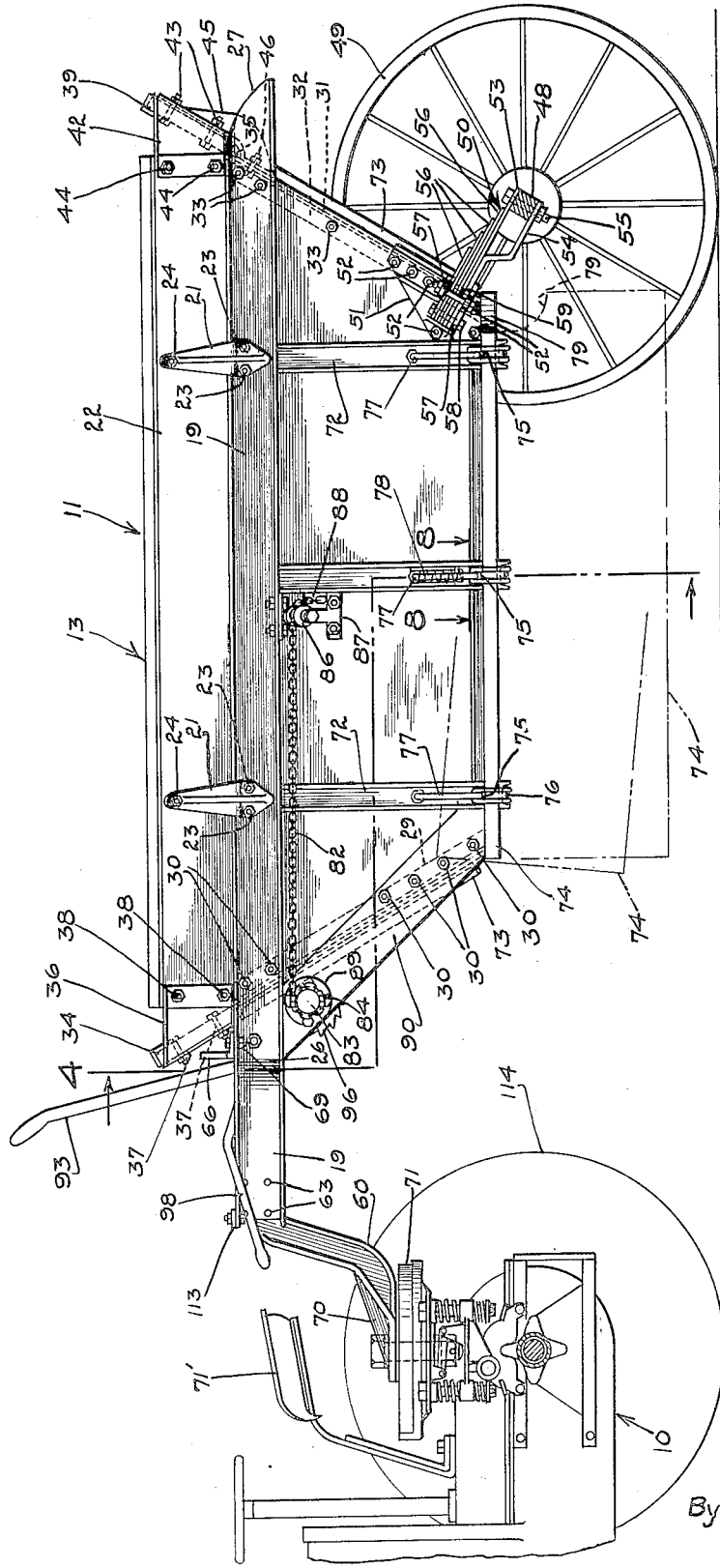
Fig. 2 is a side elevational view of the dump wagon of Fig. 1.
Figure 3:
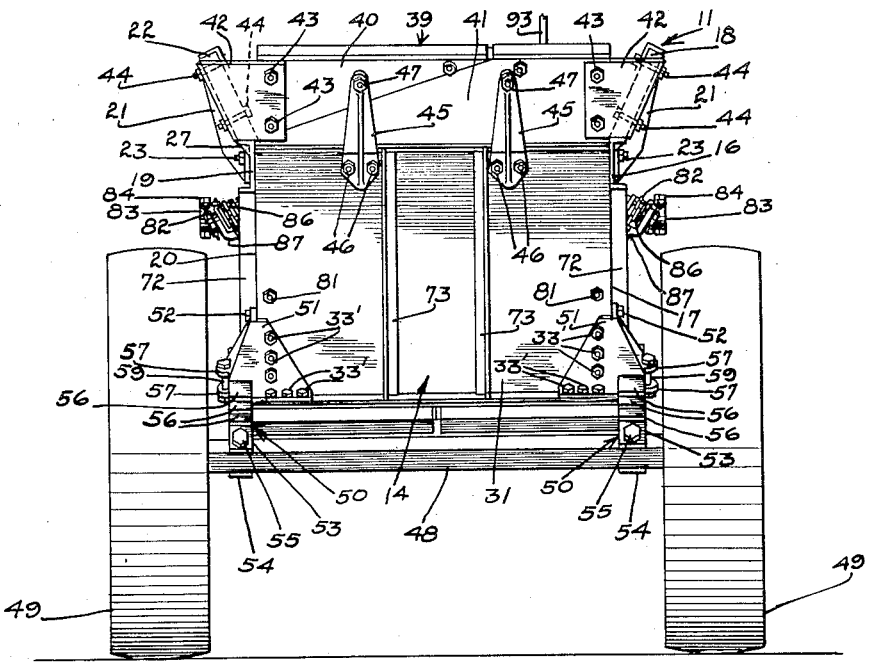
Fig. 3 is a rear end view.
Figure 4:
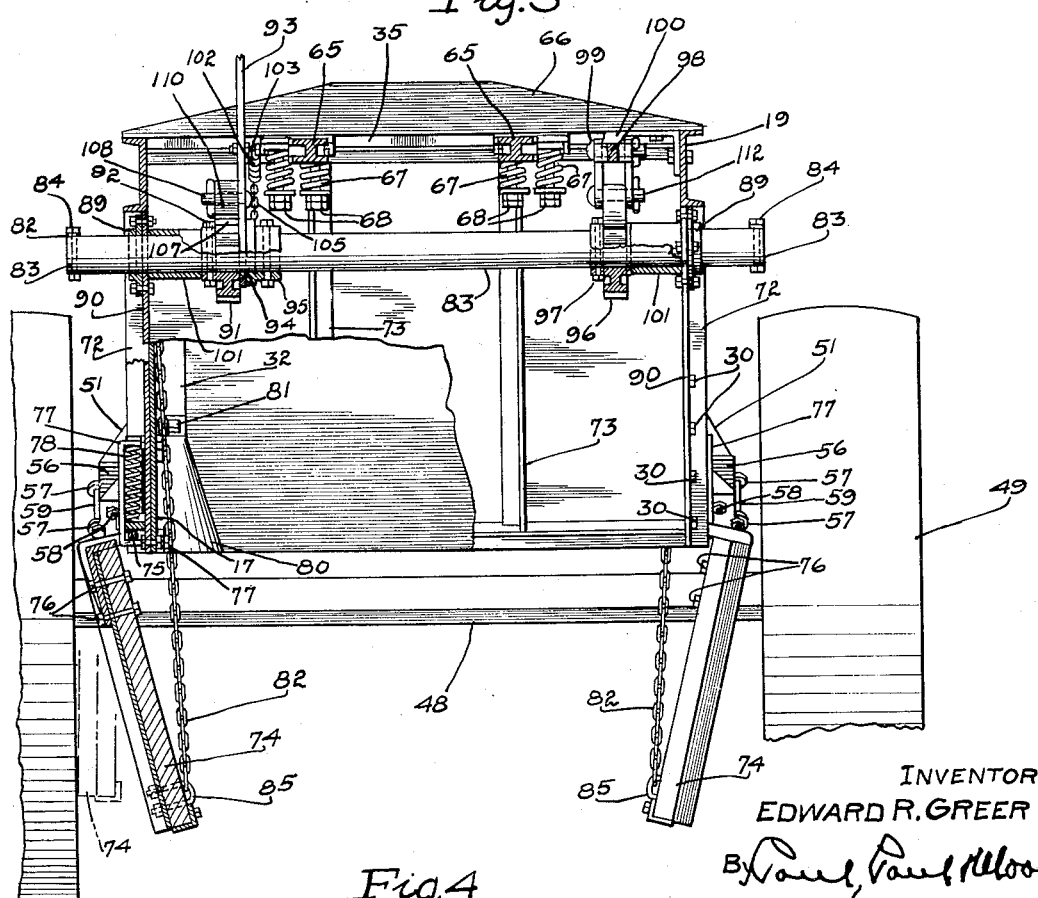
Fig. 4 is a transverse sectional view, taken substantially on line 4—4 in Fig. 2, the side and end flare boards being omitted.

The forward portion of the wagon body is supported upon the tractor 10, midway between the wheels 114 thereof. As disclosed, divergent draft beams 60 have their intermediate portions 61 pivotally connected to the upper forward portions of the said frame members 16 and 19 by means of a cross shaft 62 between said side frame members and removably secured thereto as by bolts 63 in plates 64 carrying said cross shaft. The rearward portions 65 of the draft beams 60 are yieldably connected to the side frame members by means of a cross bar 66, cushion springs 67, and bolts 68. The cross bar 66 is removably secured to the side frame members by bolts 69. The draft beams are preferably about of the configuration as disclosed in Figs. 2 and 7, to insure ample clearance for the rear wheels of the tractor when making sharp turns. The forward ends 70 of the draft beams are suitably connected in any convenient manner to a turntable 71 of the tractor, which may be of any preferred construction, desirably situated directly beneath the operator's seat 71'.

The side and end walls of the wagon box may include angular reinforcement elements designated 72 and 73, respectively, welded directly to said side and end walls.

The wagon body includes a bottom consisting of doors 74 hinged upon the outside of the wagon box side members 17 and 20. As disclosed, each bottom door has eyes 75 spaced along its length, the eyes being secured to the doors in any convenient manner, as at 76, to be about perpendicular to said doors, and each side member 17, 20 includes vertically disposed loops 77, one within each channeled reinforcement element 72, receiving said eyes. A coil spring 78 upon each middle loop 77 is adapted to push against the corresponding eye to thus urge the doors downwardly and toward the center of the wagon body. The arrangement as set forth makes provision for upward movement of the doors between the wagon box and the wagon wheels should obstructions under the lower edges of the doors push against them when they are swung down to open position, as will be obvious. Cut out portions 79 at the rearward, inner portions of the doors are to afford clearance between the doors and the rearward spring brackets when the doors are so elevated by an obstruction.

Reinforcing inner braces 80 are removably attached, as by the loops 77 and bolts 81, at the lower, rearward corners of the wagon box to stiffen and reinforce the corner brackets 42, to thus prevent distortion of the wagon box, a further function of the inside braces being to form a covering for the cut-away inside rear corners of the bottom doors.

The bottom doors 74 are operated by chains 82 connected to the opposite ends of a winding shaft 83, as at 84, and to spaced apart locations adjacent the outer margin of each door, as at 85. Each chain passes over an angularly disposed pulley 86 mounted in a bracket 87 upon the outer face of a wagon box side member, and each said side member is provided with an opening 88 through which the corresponding chain passes.

The winding shaft 83 is suitably mounted, as at 89, in supporting flanges 90 welded to the forward edges of the wagon box side members and to the lower edges of the channeled side frame members, at location below said side frame members back of the point where the wagon is supported upon the tractor, to give clearance to the rear tractor wheels when sharp turns are made, and in front of the forward end of the wagon box, whereby the winding shaft can be operated to wind up the chain to close the bottom doors by utilization of a lever within easy reach of the operator of the tractor, seated of course upon the tractor seat. As disclosed, a winding-up ratchet 91 is secured upon the winding shaft 83, as at 92, and a winding-up lever 93 is rotatably supported upon said winding shaft, as at 94, a sleeve 95 fixed to the shaft locating the winding-up lever adjacent said winding-up ratchet. A retaining ratchet 96 is secured upon said winding shaft 83, as at 97, and a retaining lever 98 is pivoted, as at 99, upon a bracket 100 secured upon the cross bar 66. Spacing sleeves 101 between said ratchets 91 and 96 and the supporting flanges 90 fix the winding shaft 83 against endwise play in its bearings. A coil spring 102 is attached at one of its ends 103 to the lever 93 and at its other end 104 to a short chain 105, itself attached, as at 106, to the wagon box front member 28, the arrangement being such that the spring and chain, working about the axis 94 of the lever 93, normally retain said lever 93 in elevated position, as will be understood. A pawl 107 is pivoted upon the lever 93, as at 108, and includes an extension 109 adapted to engage the wagon box front member 28 when the lever 93 is in elevated position to move the working end portion of said pawl into engagement with a lug 110 upon said lever, to thus limit upward movement of said lever and at the same time withhold the pawl 107 from engagement with the ratchet 91. A pawl 111 attached to the retaining lever 98, as at 112, is adapted to engage the retaining ratchet 96 when said retaining lever is positioned down against the forward extension of the channeled side frame member 19, as it is disclosed in Figs. 2 and 5, to fasten the swinging doors 74 in closed position. The weight of said retaining lever is adapted to depress said lever when released to move the pawl 111 into engagement with the ratchet 96.

Supposing that the doors 74 are closed, and a load is to be dumped, the retaining lever 98 is elevated to release the retaining ratchet 96 so that the weight of material in the wagon body will move the doors to open position. When the load is dumped and it is desired to return the doors to closed position, the retaining lever 98 is released and thus allowed to return to its position of Figs. 2 and 5, and the winding-up lever 93 is oscillated a sufficient number of times to cause the pawl 107 to actuate the winding-up ratchet to wind the chains upon the winding shaft until said doors are closed, the pawl 111 in the meantime, and finally, engaging the retaining ratchet 96 to hold the doors against return movement toward open position, as will be apparent.

The inwardly bent or curved forward extensions of the channeled side frame members 16 and 19 provide supports in relatively close relation to each other for the cross shaft 62 upon which the draft beams 60 are carried. At the same time, said forward extensions are disposed at farther distance from the tractor rear wheels 114 than they would otherwise be, to thus afford more clearance between the tractor and the dump wagon, as when making a sharp turn upon uneven ground which might in an extreme case bring a tractor wheel and a forward extension of a side frame member to about the same elevation.

A winding shaft positioned as illustrated and described will be clear of an elevating grader, and will be clear of the rear wheels of a tractor when turns are made. Under the present arrangement, a closer chain coupling, naturally permitting the use of a shorter chain, can be made, and a relatively longer winding-up lever, accessible to the operator and affording increased leverage, can be employed.

The cantilever spring arrangement as set forth cushions both the load carried and the draft pull upon the dump wagon, deflection of the cantilever springs causing the wheel base of the wagon to be lengthened.

The provision of side and end frame members each welded or otherwise formed into solid units adapted to be bolted or otherwise quickly connected together makes it a simple matter to repair or transport the various parts of the dump wagon while in knocked down condition.

I claim as my invention:

1. A dump wagon comprising a wagon box, means for supporting the forward end portion of said wagon box, corner brackets fitting over the lower, rearward corners of said wagon box, leaf springs secured to said corner brackets, and rear wheels having an axle to which said leaf springs are attached.

2. A dump wagon comprising a wagon box, means for supporting the forward end portion of said wagon box, outer corner brackets fitted to the lower, rearward corners of said wagon box, inner corner braces removably fitted to said lower, rearward corners, rear wheels having an axle, and means attaching said outer corner brackets to said axle.

3. A dump wagon comprising a wagon box, means for supporting the forward end portion of said wagon box, corner brackets fitted to the lower, rearward corners of said wagon box, rear wheels having an axle, cantilever springs secured upon said axle and extending forwardly and upwardly therefrom, and ears upon said corner brackets between which said cantilever springs are secured.

4. A dump wagon comprising a wagon box, means for supporting the forward end portion of said wagon box, swinging doors constituting the bottom of said wagon box, said doors having cut-away portions at their inner, rearward corners, outer corner brackets fitted to the lower, rearward corners of said wagon box, inner corner braces removably fitted to said lower, rearward corners to cover said cut-away portions of said doors, rear wheels having an axle, and means attaching said outer corner brackets to said axle.

5. In a dump wagon, a wagon body consisting of side and end members, doors adapted to constitute the bottom of said wagon body, means pivotally supporting said doors upon certain of said members, said means comprising eyes upon the outer edge portions of said doors, loops upon the outer faces of said certain members receiving said eyes, and springs normally urging said doors downwardly, each door when open being disposed at the outer side of said wagon body and positioned to move upwardly, should its lower edge portion meet an obstruction.

6. In a dump wagon, a wagon box comprising side and end wall members, doors adapted to constitute the bottom of said box, means pivotally supporting said doors upon said side wall members, said means comprising eyes upon the outer edge portions of said doors, elongated, vertically disposed loops upon the outer faces of said side wall members receiving said eyes, springs normally urging said doors downwardly, and said elongated loops permitting said doors to move upwardly, should their lower edge portions meet an obstruction, when said doors are opened.

7. A trailer dump wagon comprising a box having draft members secured to the forward end thereof for coupling it to a tractor, cantilever springs secured to the lower rear corners of the box and extending downwardly and rearwardly therefrom, an axle rigidly secured to the rear ends of said springs, and load carrying wheels mounted upon said axle, the angular position of said springs causing them to deflect and elongate the wheel base, when the dump wagon is being propelled and said wheels engage an obstruction, whereby the deflection of said springs will act to cushion the draw bar pull on said draft members.

8. A trailer dump wagon comprising a box having draft members yieldably secured to the forward end thereof for coupling it to a tractor, cantilever springs secured to said box and extending downwardly and rearwardly therefrom at an acute angle, an axle rigidly secured to the rear ends of said springs, suitable load carrying wheels mounted upon said axle, and the angular position of said springs causing them to deflect and elongate the wheel base, when the trailer is moving forwardly and said wheels engage an obstruction, whereby the deflection of said springs will act to cushion the draw bar pull on said draft members.

In witness whereof, I have hereunto set my hand this 25th day of March 1929.

EDWARD R. GREER.